US010293916B2

(12) United States Patent
Knepper et al.

(10) Patent No.: US 10,293,916 B2
(45) Date of Patent: May 21, 2019

(54) AIRCRAFT AND METHOD OF COUNTERING AERODYNAMIC EFFECTS OF PROPELLER WAKE (71) Applicant: GE Aviation Systems LLC, Grand Rapids, MI (US)

(72) Inventors: Angela Marie Knepper, Cheltenham (GB); Paul Nicholas Methven, Churchdown (GB)

(73) Assignee: GE Aviation Systems LLC, Grand Rapids, MI (US)

( * ) Notice: Subject to any disclaimer, the term of this patent is extended or adjusted under 35 U.S.C. 154(b) by 305 days.

(21) Appl. No.: 15/205,308

(22) Filed: Jul. 8, 2016

(65) Prior Publication Data
US 2017/0008610 A1   Jan. 12, 2017

(30) Foreign Application Priority Data
Jul. 8, 2015   (GB) .................. 1511926.6

(51) Int. Cl.
*B64C 3/10*   (2006.01)
*B64D 27/12*   (2006.01)
(Continued)

(52) U.S. Cl.
CPC ............. *B64C 3/10* (2013.01); *B64C 11/18* (2013.01); *B64D 27/12* (2013.01); *B64D 33/02* (2013.01);
(Continued)

(58) Field of Classification Search
CPC ........... B64C 3/10; B64C 11/18; B64D 33/02; B64D 27/12; B64D 2033/0293; Y02T 50/12
See application file for complete search history.

(56) References Cited

U.S. PATENT DOCUMENTS 2,165,482 A   7/1939   Hovgard
2,402,311 A   6/1946   Bissett
(Continued)

FOREIGN PATENT DOCUMENTS

GB   559621 A   2/1944
JP   H03-125698 U1   12/1991
WO   2011021206 A2   2/2011

OTHER PUBLICATIONS

Machine Translation and First Office Action and Search issued in connection with corresponding CN Application No. 201610535061.7 dated Feb. 5, 2018.
(Continued)

*Primary Examiner* — Valentina Xavier
(74) *Attorney, Agent, or Firm* — McGarry Bair PC (57) ABSTRACT An aircraft is disclosed, the aircraft having a fuselage having a centerline, and a wing extending from the fuselage and having a leading edge and a trailing edge. Additionally, the aircraft includes an engine mounted to the wing and having a rotating output shaft, and a propeller operably coupled to the output shaft and generating a rotating flow field to define a propeller wake when the propeller is rotated by the rotating output shaft. The propeller is located forward of the leading edge of the wing, so the propeller wake flows over the wing forming localized areas of effectively increased angle of attack generating a corresponding increased wing loading, with the wing having corresponding localized areas of reduced chord length to neutralize the otherwise increased wing loading. A method of countering the aerodynamic effects of propeller wake acting on a wing is also disclosed.

19 Claims, 5 Drawing Sheets

(51) Int. Cl.
 *B64D 33/02* (2006.01)
 *B64C 11/18* (2006.01)
(52) U.S. Cl.
 CPC ....... *B64D 2033/0293* (2013.01); *Y02T 50/12* (2013.01)

(56) References Cited

U.S. PATENT DOCUMENTS

| | | | |
|---|---|---|---|
| 3,179,354 A | 4/1965 | Alvarez-Calderon | |
| 5,195,702 A * | 3/1993 | Malvestuto, Jr. | B63B 1/248 |
| | | | 114/330 |
| 6,746,207 B1 | 6/2004 | Mundt et al. | |
| 8,740,139 B1 | 6/2014 | Dunavan | |
| 2009/0152405 A1 * | 6/2009 | Kelm | B64C 3/50 |
| | | | 244/215 |
| 2010/0193644 A1 * | 8/2010 | Karem | B64C 3/10 |
| | | | 244/7 R |
| 2011/0121130 A1 | 5/2011 | Odle et al. | |
| 2012/0104183 A1 | 5/2012 | Narasimha et al. | |

OTHER PUBLICATIONS

Office Action issued in connection with corresponding CA Application No. 2935357 dated Jun. 13, 2017.
Machine Translation of Notification of Reasons for Refusal issued in connection with corresponding JP Application No. 2016-132937 dated Aug. 1, 2017.
Great Britain Search Report and Opinion issued in connection with corresponding GB Application No. 1511926.6 dated Jan. 11, 2016.
Veldhuis, L.L.M., "Propeller Wing Aerodynamic Interference," In The Aerospace Engineering, Chapter 7, "Optimization of tractor propeller-wing configurations" pp. 1-56 (Jun. 28, 2005).
Preliminary Search and Examination Report issued in connection with corresponding FR Application No. 1656582 dated Jun. 12, 2018.

* cited by examiner

AIRCRAFT AND METHOD OF COUNTERING AERODYNAMIC EFFECTS OF PROPELLER WAKE

BACKGROUND

Contemporary turbo-prop engine aircraft can include one or more propellers attached to wings of the aircraft. When a propeller is installed on an aircraft, it will significantly alter the air flow field around the airframe. This is due to the rotating propeller generating a helical or spiral air flow field, known as a propeller wake, which affects the downstream air flow field.

The propeller wake includes axial and rotational components of velocity. The rotational components can either add or subtract to the lift generated by the wing, creating localized areas of increased or decreased lift along the wing span as compared to the lift generated by the wing without the wake. Thus, the installed propeller significantly modifies the flow field around the airframe, which is immersed in the propeller wake.

Current generation turbo-prop aircraft have been designed as an assembly of components, with each component created in isolation with minimal consideration of the created environment on the other aircraft components. More specifically, the propeller and airframe are designed independently. Thus, current wing designs do not attempt to compensate for the propeller wake. Instead, compensation for the effects of the wake is primarily handled by the aircraft trim adjustments.

BRIEF DESCRIPTION

In one aspect, an embodiment relates to an aircraft including a fuselage having a centerline, a wing extending from the fuselage and having a leading edge and a trailing edge, an engine mounted to the wing and having a rotating output shaft, a propeller operably coupled to the output shaft and generating a rotating flow field to define a propeller wake when the propeller is rotated by the rotating output shaft, wherein the propeller is located forward of the leading edge of the wing such that the propeller wake flows over the wing forming localized areas of effectively increased angle of attack generating a corresponding increased wing loading, with the wing having corresponding localized areas of reduced chord length to neutralize the otherwise increased wing loading, and localized areas of effectively decreased angle of attack generating a corresponding decreased wing loading, with the wing having corresponding localized areas of increased chord length to neutralize the otherwise decreased wing loading.

In another aspect, an embodiment relates to an aircraft including a fuselage having a centerline, a wing extending from the fuselage and having a leading edge and a trailing edge, an engine mounted to the wing and having a rotating output shaft, a propeller operably coupled to the output shaft and generating a rotating flow field to define a propeller wake when the propeller is rotated by the rotating output shaft, wherein the propeller is located forward of the leading edge of the wing such that the propeller wake flows over the wing forming localized areas of effectively increased and effectively decreased angle of attack of the air flowing over the wing, and the wing has corresponding localized areas of physical variation to substantially neutralize any corresponding localized wing loading attributable to the effectively increased and effectively decreased angle of attack of the air flowing over the wing.

In yet another aspect, an embodiment relates to a method of countering the aerodynamic effects of propeller wake acting on a wing, the method including locally altering a physical characteristic of the wing at a local interface of the propeller wake and the wing to counter wing loading from the propeller wake.

DETAILED DESCRIPTION

In some cases, such as a multiple engine installation, the effects of the wake on the flow field can move the center of lift for the wing sufficiently offset from the aircraft centerline that trim adjustments needed to compensate for straight and level flight resulting in a substantial drag increase, leading to an undesirable increase in fuel consumption. Embodiments are related to treating the propeller and airframe as an integrated system in the turbo-prop aircraft. This may provide a variety of benefits as compared to when the propeller and airframe are designed independently including that the overall performance of the aircraft may be improved including allowing the effects of the propeller slipstream to be exploited. This full system integration has the potential to reduce the aircraft trim drag and the engine intake drag, improving the engine performance, and improving overall aircraft efficiency.

Figure 1A:
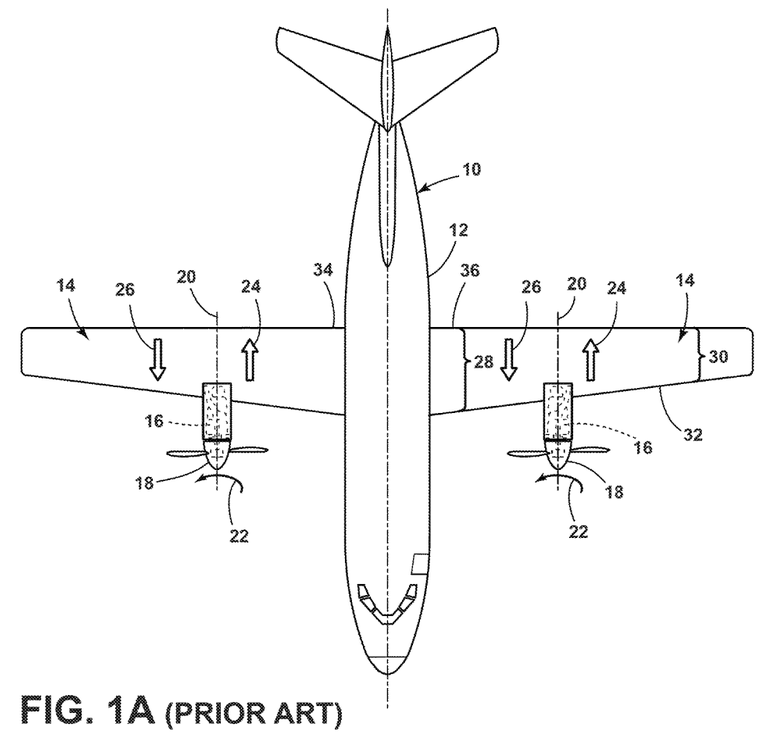
FIG. 1A illustrates an example schematic top view of a prior art aircraft having wings and propellers.

To further explain the problem, FIG. 1A depicts a prior art aircraft 10 having a fuselage 12 and non-compensated wings 14 extending outward from the fuselage 12. Turbo-prop engines 16 and propellers 18 are coupled to the wings 14. Propeller centerlines are indicated at 20 and the direction of propeller rotation is illustrated with arrows 22. The propeller wake generated aft of an upward moving blade will produce an increase in the local angle of attack on the wing and hence, an increase in wing loading, which has been indicated with arrows 24. Conversely, the propeller wake generated aft of a downward moving blade will produce a decrease in the local angle of attack on the wing and hence, a decrease in wing loading, which has been indicated with arrows 26.

Figure 1B:
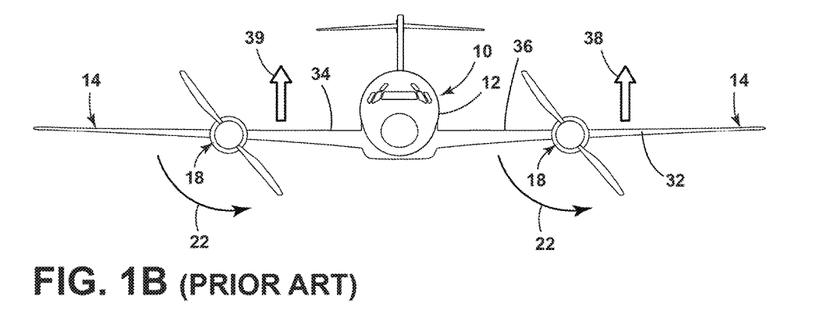
FIG. 1B illustrates an example schematic front view of the aircraft of FIG. 1A.

The non-compensated wings 14 have varied wing chords; more specifically, the chord continuously tapers from root 28 to tip 30. In this manner, the non-compensated wings 14 have a "sweep angle" to the leading edge, which forms a linear leading edge 32. FIG. 1B illustrates that if the propellers 18 are rotating in the same direction, then the propeller wake will produce an increase in the local angle of attack on the wing 14 and hence, an increase in wing loading inboard of the propeller centerline 20 (FIG. 1A) on one side 34 of the aircraft 10 and outboard of the propeller centerline 20 on the other side 36 of the aircraft 10. This results in a center of lift that is further outboard on one wing as illustrated with arrow 38 and a center of lift that is further inboard on one wing as illustrated with arrow 39. This, in turn, will require an aircraft trim correction in order to maintain straight and level flight.

Figure 2:
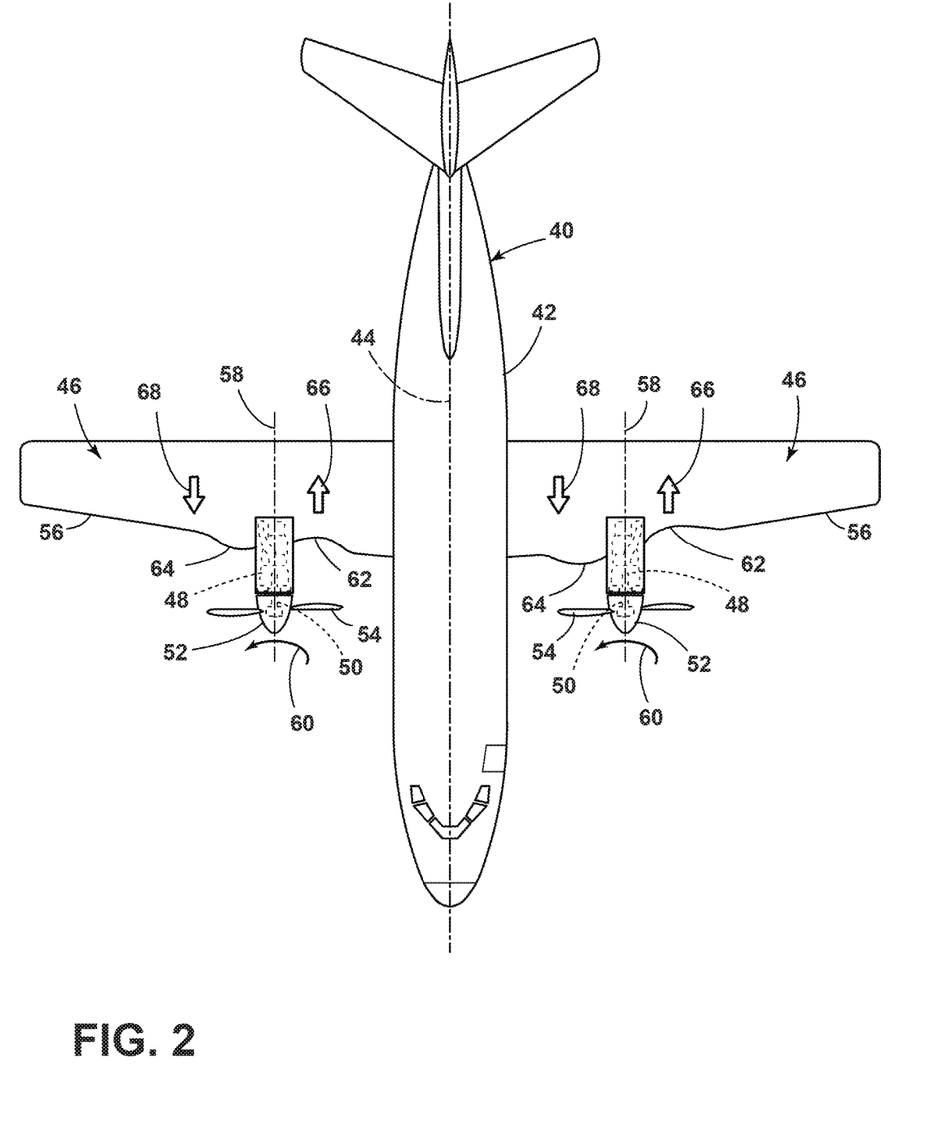
FIG. 2 illustrates an example schematic top view of an aircraft in accordance with various aspects described herein.

Embodiments of the present innovation relate to modifying the wing geometry and/or propeller geometry, such that the loading distribution on each wing is more symmetrical such that there will be a resulting reduction in trim drag. One such possible modification to the wing geometry incorporates having varied wing chords from the non-compensated wings described above. The wing geometry having the varied wing chords compensate for the localized effects of the propeller wake, as shown in FIG. 2. More specifically, FIG. 2 is a schematic top view of an aircraft 40 having a fuselage 42 with a centerline 44. A wing 46 extends laterally from the fuselage 42 on both sides of the centerline 44. An engine 48 is mounted to each wing 46 and includes a rotating output shaft 50. In this manner, one of the two engines 48 is mounted to the wing 46 on one side of the centerline 44 and the other engine 48 is mounted to the wing 46 on the other side of the centerline 44.

A corresponding propeller 52, with blades 54, is operably coupled to the output shaft 50. The propeller 52 is located forward of a leading edge 56 of the wing 46. The propeller 52 generates a rotating flow field to define a propeller wake when the propeller is rotated by the rotating output shaft. Propeller centerlines are indicated at 58 and the direction of propeller rotation is illustrated with arrows 60. In the illustrated example, the propellers 52 rotate in the same direction. While the aircraft 40 has been illustrated as having a single turbo-prop engine 48 and propeller 52 on each wing 46, it is contemplated that the embodiments can be utilized with any suitable aircraft having any number of propellers 52.

The propeller wake flows over the wing 46 and forms localized areas of effectively increased and effectively decreased angle of attack. The wing 46 has been formed with corresponding localized areas of reduced chord length and increased chord length, respectively. More specifically, where the propeller wake flows over the wing forming the localized areas of effectively increased angle of attack generating a corresponding increased wing loading, the wing has corresponding localized areas of reduced chord length to neutralize the otherwise increased wing loading. Similarly, where the propeller wake flows over the wing forming the localized area of effectively decreased angle of attack generating a corresponding decreased wing loading, the wing has corresponding localized areas of increased chord length to neutralize the otherwise decreased wing loading. The localized areas of reduced chord length and increased chord length do not form a linear leading edge.

In the exemplary illustration, there is a reduction in wing chord indicated as 62, aft of the upward moving blade 54 and an increase in the wing chord indicated at 64 aft of the downward moving blade 54. These modifications to the wing chord are generally non-linear and will reduce the local wing loading aft of the upward moving blade as indicated at 66 and increase the local wing loading aft of the downward moving blade as indicated at 68. In this manner, the decreased chord length can act to neutralize an otherwise corresponding increase in wing loading and the increased chord length can act to neutralize an otherwise corresponding decrease in wing loading.

These modifications to the wing chord and the resulting local wing loading result in more symmetrical loading distribution on the wings 46, relative to the aircraft centerline 44, which in turn results in reduced trim drag. The localized areas of reduced chord length 62 and increased chord length 64 substantially neutralize any corresponding increase or decrease, respectively, of wing loading from the propeller wake acting on the wing 46 without the localized areas of reduced and increased chord length. While not a requirement, the localized areas of reduced chord length 62 and increased chord length 64 can be selected such that an aerodynamic center of the aircraft 40 remains on the fuselage centerline 42. Further, the localized areas of reduced and increased chord length can substantially neutralize any additional trim correction for level flight.

Figure 3:
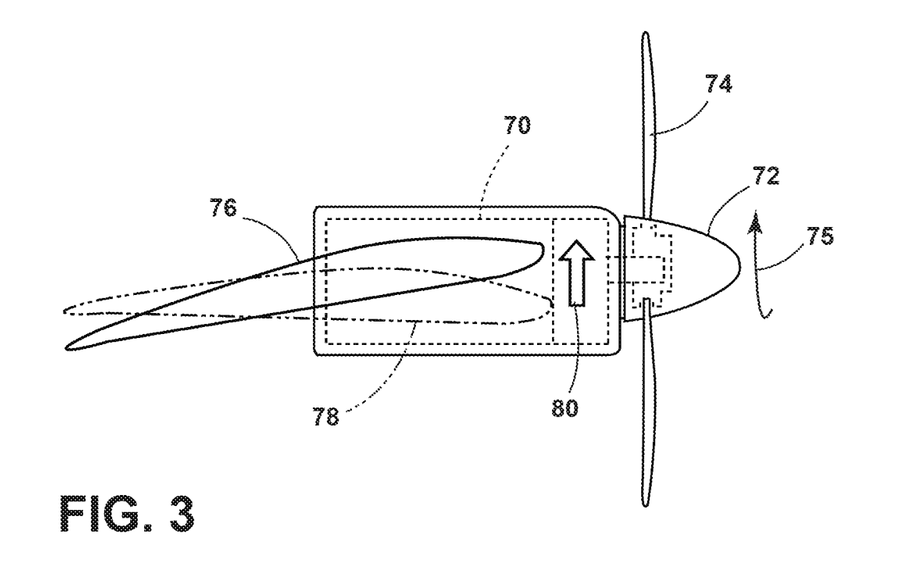
FIG. 3 illustrates an example schematic side view of a portion of an engine, propeller, and inboard portion of a wing in accordance with various aspects described herein.

Referring now to FIG. 3, a side view of a portion of an engine 70, propeller 72 with blades 74 rotating in a direction into the page as indicated by arrow 75, and inboard portion of a wing 76 are illustrated and show another possible modification to the wing geometry. More specifically, the inboard portion of the wing 76 incorporates an increase in wing twist over the inboard region of the wing as compared to a non-compensated wing 78. The wing incorporates the increase in the wing twist aft of a downward moving blade 74. This increase in inboard twist or local twisting of the wing upward will increase the local angle of attack of the wing 76. The increased local angle of attack of the wing neutralizes a corresponding decrease in local wing loading. More specifically, this increase in inboard twist will increase the local wing loading aft of the downward moving blade 74 as indicated by arrow 80.

Figure 4:
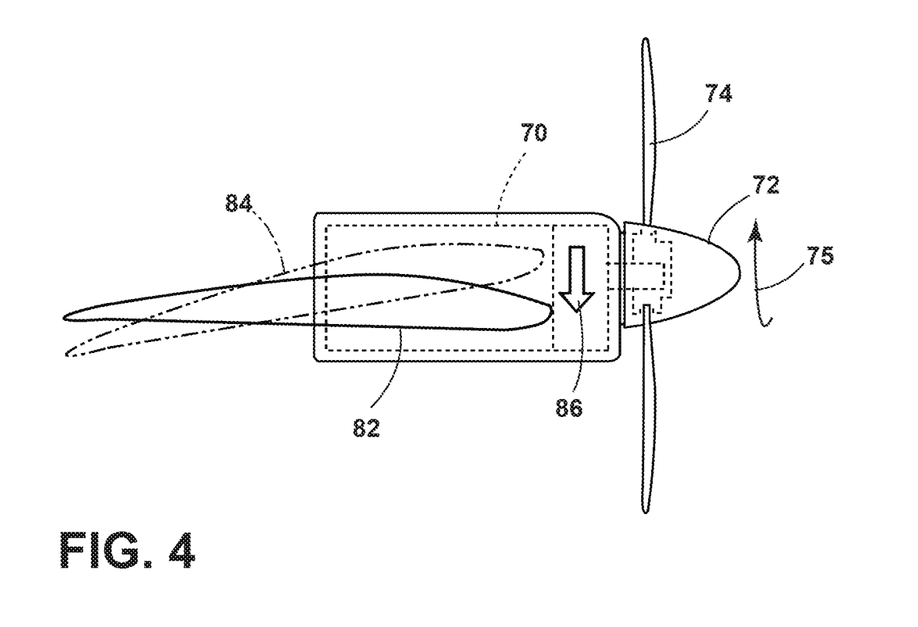
FIG. 4 illustrates an example schematic side view of a portion of an engine, propeller, and outboard portion of a wing in accordance with various aspects described herein.

Conversely, FIG. 4 illustrates a side view of a portion of the engine 70, propeller 72 with blades 74, and outboard portion of a wing 82 and shows another possible modification to the wing geometry. More specifically, the wing twist is reduced over the outboard region of the wing as compared to a non-compensated wing 84. The wing incorporates the decrease in the wing twist aft of an upward moving blade 74. This decrease in outboard twist or local twisting of the wing downward will decrease the local angle of attack of the wing. The decreased local angle of attack of the wing neutralizes a corresponding increase in local wing loading. More specifically, this decrease in outboard twist will decrease the local wing loading aft of an upward moving blade as indicated by arrow 86, in favor of a more symmetrical wing loading distribution.

On the opposite wing (not shown), the wing twist can be reduced over the inboard region of the wing aft of an upward moving blade, to reduce the local angle of attack and reduce the local wing loading. Further, the wing twist can be increased over the outboard region of the wing aft of a downward moving blade, to increase the local angle of attack and increase the local wing loading. The combined effects of the modifications to the wing twist result in a more symmetrical loading distribution over the wing, which in turn reduces the trim drag.

It will be understood that the modifications to wing twist as illustrated in FIGS. 3-4 can be implemented in conjunction with or independent of modifications to the local wing chord as illustrated in FIG. 2. Other possible modifications to the wing geometry, which can affect wing loading and can be used in conjunction with chord and twist changes to produce a more symmetrical loading, include but are not limited to: wing camber, leading-edge or trailing-edge sweep, airfoil profile, leading-edge/trailing-edge devices, or winglets. By way of non-limiting examples, the localized areas of reduced and increased chord length for the wing can also have localized areas of decreased and increased twist, respectively and the localized areas of reduced and increased chord length for the wing can also have localized areas of decreased and increased camber, respectively.

In this manner, it will be understood that in cases where the propeller is located forward of the leading edge of the wing such that the propeller wake flows over the wing forming localized areas of effectively increased and effectively decreased angle of attack of the air flowing over the wing, the wing can have corresponding localized areas of physical variation to substantially neutralize any corresponding localized wing loading attributable to the effectively increased and effectively decreased angle of attack of the air flowing over the wing. The localized areas of physical variation can include a localized variation in at least one of, two of, or all of the chord length, twist, and camber. The localized variation in chord length and twist have been described above. The localized variation in camber of the wing includes at least one of locally decreasing the camber of the wing to neutralize a corresponding increase in wing loading or locally increasing the camber of the wing to neutralize a corresponding decrease in wing loading. The localized areas of physical variation can be selected such that an aerodynamic center of the aircraft remains on the fuselage centerline. The localized areas of physical variation can substantially neutralize any additional trim correction for level flight.

The above described examples illustrate methods of countering the aerodynamic effects of propeller wake acting on a wing. Such methods include locally altering a physical characteristic of the wing at a local interface of the propeller wake and the wing to counter variations in wing loading from the propeller wake. Locally altering the physical characteristic substantially neutralizes trim drag that would have resulted without the locally altering the physical characteristic.

Figure 5:
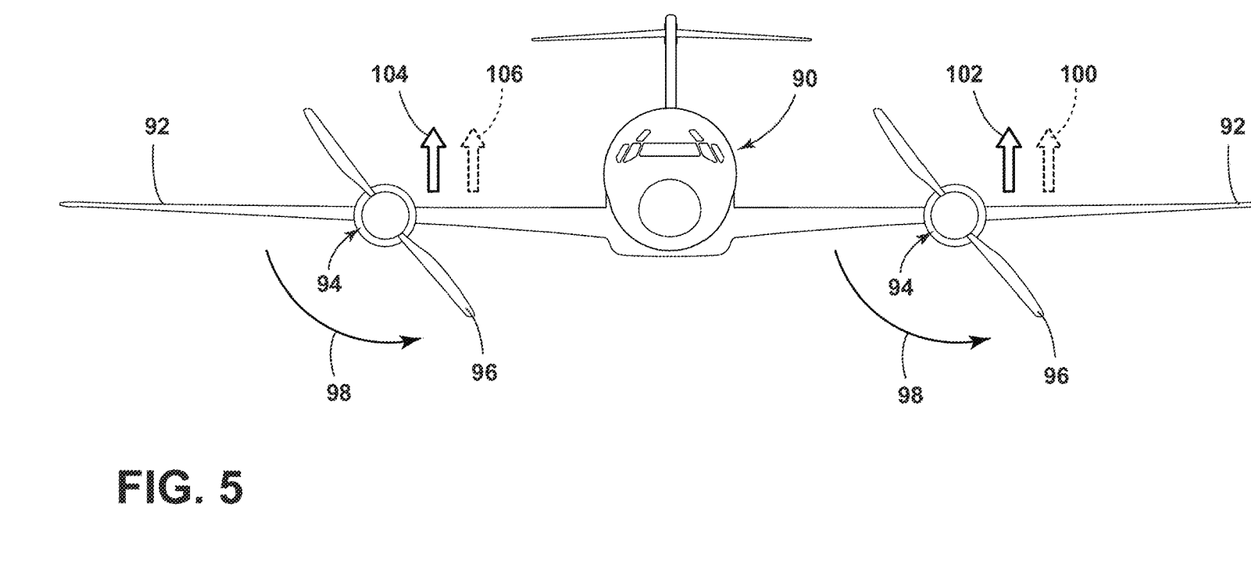
FIG. 5 illustrates an example schematic front view of an aircraft illustrating modified propeller loading in accordance with various aspects described herein.

Further still, it is also contemplated that the propeller geometry can be modified to change the propeller loading in order to improve the symmetry of the loading distribution on the wings and hence, reduce the trim drag. Referring to FIG. 5, an aircraft 90 having wings 92 with a propeller 94 having blades 96 included on the wings 92. When the propellers 94 are rotating in the same direction as indicated by arrows 98, the center of lift is further outboard on one wing as indicated with arrow 100. This results in a larger moment and a higher trim drag. Embodiments propose modifying the propeller geometry such that the propeller loading is moved further inboard, which can move the center of lift on the outboard section of the wing further inboard, as indicated by the arrow 102 and conversely move the center of lift on the inboard section of the other wing further outboard, as indicated by arrow 104, from its current loading indicated with arrow 106, which reduces the moment and the corresponding trim drag. Such modified propeller loading generates smaller moment and reduced trim drag. Possible modifications to the propeller geometry to achieve the change in propeller loading can include, but is not limited to, chord, twist, camber, thickness, sweep, or airfoil profile. It will be understood that moving the propeller loading inboard can be in isolation or in conjunction with wing modifications to produce a more symmetrical wing loading and decrease trim drag.

Figure 6:
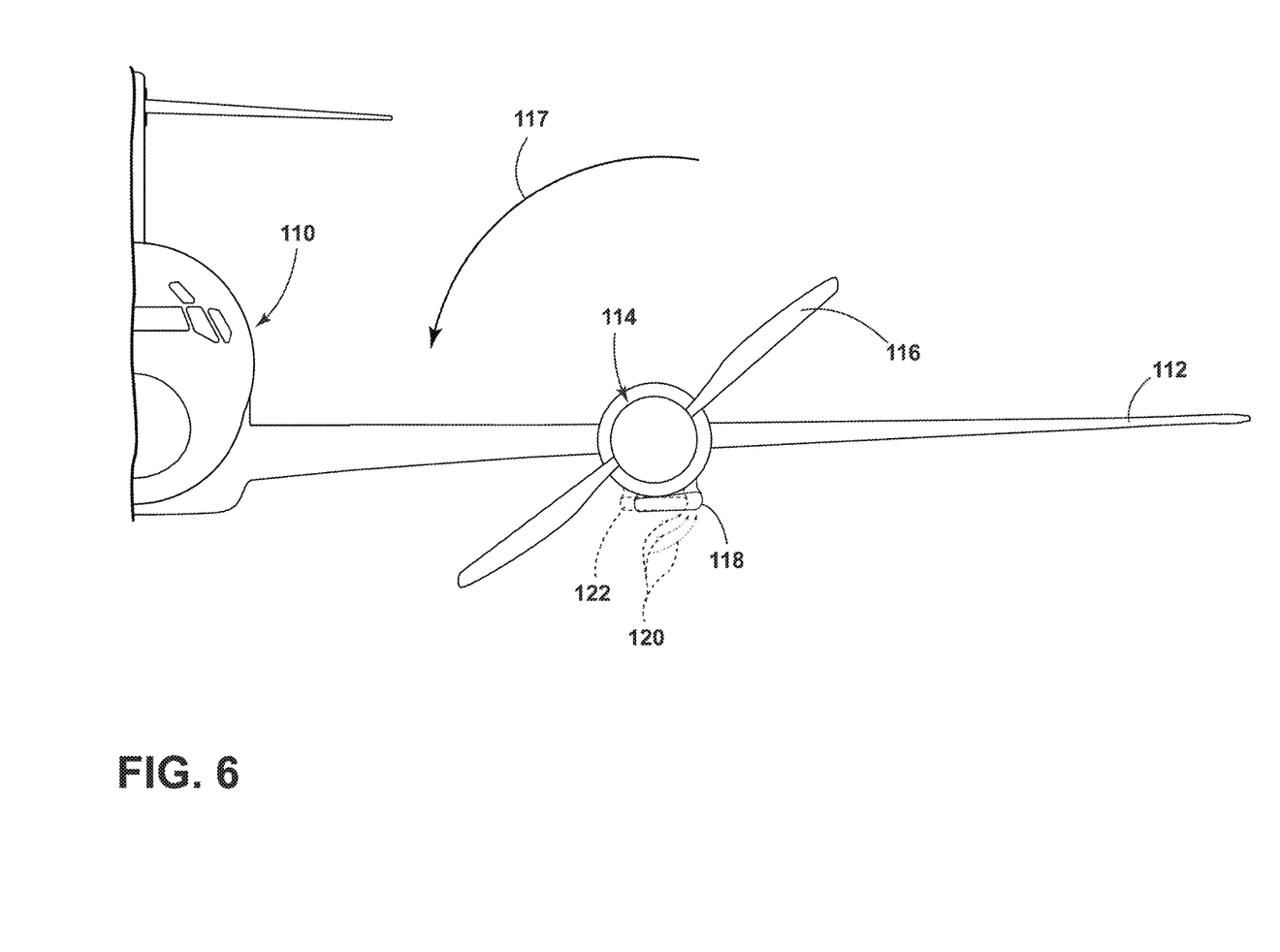
FIG. 6 illustrates an example schematic front view of a portion of an aircraft having an engine intake in accordance with various aspects described herein.

FIG. 6 is a schematic front view of a portion of an aircraft 110 having a wing 112 on which is mounted a propeller 114, having blades 116 rotating in a direction indicated by arrow 117, and an engine intake 118 according to another embodiment. The propeller 114 generates a wake flow 120 illustrate as arrows. In non-compensated aircraft, the wake flow 120 is upstream of the non-compensated nacelle engine intake 122 (shown in phantom). In contrast, the engine intake 118 of the inventive embodiment is more aligned with the wake flow 120 generated by propeller 114. The location and the geometry, profile, or shape of the engine intake 118 can be modified to align the engine intake 118 with the location of the wake flow 120. In this manner, the engine intake 118 can be modified to operate within the propeller wake flow field 120. Such modifications can result in reduced intake drag and reduced distortion of the flow field ingested by the nacelle engine intake and entering into the engine core. Further, the inboard propeller blade loading can be increased, as described above, to generate a higher intake pressure, which can also improve the engine performance.

The above-described embodiments may have a variety of benefits including that treating the propeller and airframe as an integrated system allow the effects of the propeller slipstream to be exploited. While this can in turn result in individual component performance being compromised problems associated with asymmetrical loading on the lifting surfaces of an aircraft can be resolved. The above-described embodiments modify the wing geometry or propeller loading such that the loading distribution on each wing is more symmetrical, which results in reductions in trim drag and reduced distortion of the flow field entering the engine intake. The reduced trim drag will result in an aircraft drag reduction, which will result in reduced fuel burn and hence, decreased fuel consumption. Reducing the distortion of the flow field entering the engine intake will result in a reduction in intake drag and fuel burn, which will result in a decrease in fuel consumption. Furthermore, the propeller loading can be modified to result in a higher intake pressure to the engine, which will, in turn, improve the engine performance.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the embodiments, including the best mode, and also to enable any person skilled in the art to practice the innovation, including making and using any devices or systems and performing any incorporated methods. The patentable scope of the innovation is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. An aircraft comprising:
   a fuselage having a centerline;
   a wing extending from the fuselage and having a leading edge and a trailing edge defining a chord therebetween;
   an engine mounted to the wing and having a rotating output shaft; and a propeller operably coupled to the output shaft and configured to generate a rotating flow field to define a propeller wake when the propeller is rotated by the rotating output shaft;

wherein the propeller is located forward of the leading edge of the wing such that the propeller wake flows over the wing forming localized areas of effectively increased angle of attack generating a corresponding increased wing loading, with the wing having a corresponding reduction in chord formed in the leading edge at the localized areas of effectively increased angle of attack to neutralize the otherwise increased wing loading, and localized areas of effectively decreased angle of attack generating a corresponding decreased wing loading, with the wing having a corresponding increase in chord formed in the leading edge at the localized areas of effectively decreased angle of attack to neutralize the otherwise decreased wing loading.

2. The aircraft of claim 1, wherein the reduction in chord in the leading edge and the increase in chord in the leading edge are selected such that an aerodynamic center of the aircraft remains on the fuselage centerline.

3. The aircraft of claim 1, wherein the reduction in chord in the leading edge and the increase in chord in the leading edge for the wing also have a decrease in twist at the reduction in chord and an increase in twist at the increase in chord, respectively.

4. The aircraft of claim 1, wherein the reduction in chord in the leading edge and the increase in chord in the leading edge for the wing also have a decreased in camber at the reduction in chord and an increase in camber at the increase in chord.

5. The aircraft of claim 1, wherein the reduction in chord in the leading edge and the increase in chord in the leading edge reduce required trim correction for level flight.

6. The aircraft of claim 1, further comprising the wing extending laterally from the fuselage on both sides of the centerline, at least two engines, with a corresponding propeller, and one of the at least two engines mounted to the wing on one side of the centerline, the other of the at least two engines mounted to the wing on the other side of the centerline, wherein the propellers rotate in the same direction.

7. The aircraft of claim 1, wherein the engine further includes an engine intake angled toward the reduction in chord in the leading edge.

8. An aircraft comprising:
a fuselage having a centerline;
a wing extending from the fuselage and having a leading edge and a trailing edge defining a chord therebetween;
an engine mounted to the wing and having a rotating output shaft; and
a propeller operably coupled to the output shaft and configured to generate a rotating flow field to define a propeller wake when the propeller is rotated by the rotating output shaft;
wherein the propeller is located forward of the leading edge of the wing such that the propeller wake flows over the wing forming localized areas of effectively increased and effectively decreased angle of attack of the air flowing over the wing, and the wing has a corresponding local decrease in chord formed in the leading edge at the local area of effectively increased angle of attack and a local increase in chord formed in the leading edge at the local area of effectively decreased angle of attack.

9. The aircraft of claim 8, wherein the local decrease in chord and the local increase in chord include localized increase or decrease in at least one of a local increase or decrease in twist, or camber, respectively.

10. The aircraft of claim 8, wherein the local decrease in chord and the local increase in chord include localized increase or decrease in both twist and camber, respectively.

11. The aircraft of claim 8, wherein the local decrease in chord length neutralizes a corresponding increase in wing loading and the local increase in chord length neutralizes a corresponding decrease in wing loading.

12. The aircraft of claim 10, wherein the localized increase or decrease in twist of the wing includes locally decreasing the twist of the wing to neutralize a corresponding increase in wing loading and locally increasing the twist of the wing to neutralize a corresponding decrease in wing loading.

13. The aircraft of claim 10, wherein the localized increase or decrease in camber of the wing includes locally decreasing the camber of the wing to neutralize a corresponding increase in wing loading and locally increasing the camber of the wing to neutralize a corresponding decrease in wing loading.

14. The aircraft of claim 8, wherein the local decrease in chord and the local increase in chord are selected such that an aerodynamic center of the aircraft remains on the fuselage centerline.

15. The aircraft of claim 8, wherein the local decrease in chord and the local increase in chord substantially neutralize any additional trim correction for level flight.

16. The aircraft of claim 8, further comprising the wing extending laterally from the fuselage on both sides of the centerline, at least two engines, with a corresponding propeller, and one of the at least two engines mounted to the wing on one side of the centerline, the other of the at least two engines mounted to the wing on the other side of the centerline, wherein the propellers rotate in the same direction.

17. A method of countering aerodynamic effects of propeller wake acting on a wing, the method comprising:
locally reducing at least two of a chord, an angle of attack, or a camber of the wing at a local area of effectively increased angle of attack resultant of propeller wake and increasing at least two of the chord, the angle of attack, or the camber of the wing at a local area of effectively decreased angle of attack resultant of the propeller wake to counter wing loading from the propeller wake.

18. The method of claim 17, wherein the locally increasing or decreasing the chord, angle of attack or camber of the wing includes locally increasing or decreasing all three of the chord, the angle of attack, or the camber.

19. The method of claim 17, wherein the locally increasing or decreasing the chord, angle of attack, or camber reduces trim drag that would have resulted without the locally increasing or decreasing the chord, angle of attack, or camber.

* * * * *